Jan. 28, 1958     E. C. BOPF     2,820,989
DISCHARGE ELEVATOR FOR COTTON HARVESTER
Filed Oct. 5, 1955
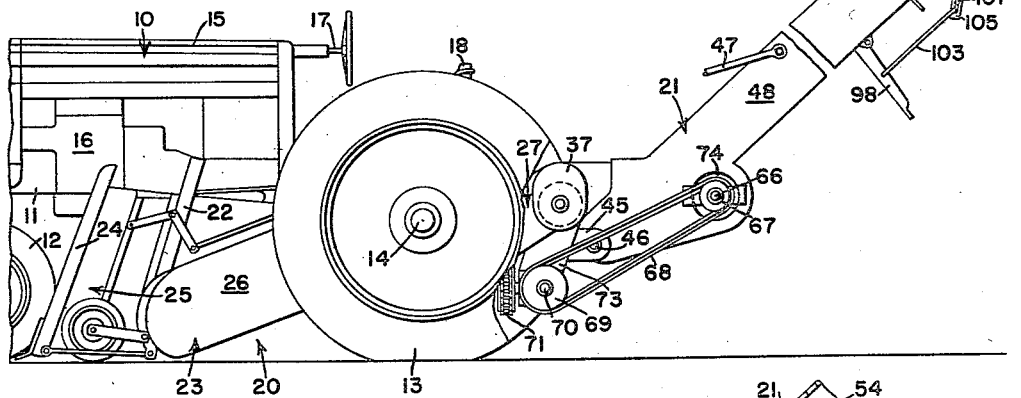
FIG. 1
FIG. 2
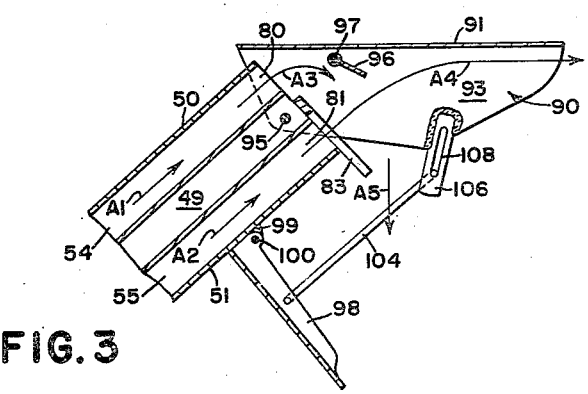
FIG. 3
INVENTOR.
E. C. BOPF

United States Patent Office 2,820,989
Patented Jan. 28, 1958

2,820,989

DISCHARGE ELEVATOR FOR COTTON HARVESTER

Edward C. Bopf, Des Moines, Iowa, assignor to Deere Manufacturing Co., Dubuque, Iowa, a corporation of Iowa Application October 5, 1955, Serial No. 538,588

6 Claims. (Cl. 19—72)

The invention relates to a cotton harvester of the type adapted to be mounted on a tractor or other type of motive vehicle and to move over a field of row planted cotton to indiscriminately pick ripe and green bolls from the cotton plants and to convey them to a trailing receptacle. More particularly this invention relates to a material discharge elevator which receives the commingled ripe and green bolls from the harvesting unit and elevates them rearwardly to the receptacle.

The material discharge elevator normally used with a cotton harvester is of the type in which a chain conveyor extends the length of the elevator and operates over sprockets positioned at opposite ends of the elevator. Provision is made to drive the conveyor by means of a chain, belt, or transmission drive, driven from the tractor. In recent years there has been provided, to operate with this type of elevator, a blower which directs a blast of air at the stream of materials discharging from the elevator in order to separate the ripe bolls from the green bolls by blowing or driving the ripe bolls from the stream of materials. There is therefore normally required a second drive or transmission system for operating the blower means, which is also driven from the tractor.

It is the primary object of this invention to provide an improved type of material discharge elevator for a cotton harvester in which all moving parts of the conveying system are eliminated by utilizing a blower type of elevator or conveyor.

Also an object of this invention is to provide an elevator of the blower type which incorporates the use of a single blower means not only to separate the ripe bolls from the green bolls but also to provide a blast of air directed at and of sufficient intensity to drive the commingled bolls exiting from the harvesting unit to the discharge end of the elevator. Thus, will be provided a material discharge elevator which requires only a single drive or transmission from the tractor to both convey the materials and to separate the materials. The simple arrangement will reduce the initial cost of the elevator. Likewise, the simple construction of the elevator will tend to lighten it as well as eliminate moving parts which are a source of operational and maintenance expense of a conventional type elevator.

Other objects and advantages of the invention will become apparent to those skilled in the art as the nature of the invention is better understood from the following detailed description illustrated in the accompanying drawings.

Fig. 1 is a fragmentary side view of a tractor and a tractor mounted cotton stripper having a discharge elevator incorporating the principles of the present invention. Portions of the rear wheel of the tractor is removed in order to clearly illustrate parts of the invention.

Fig. 2 is an enlarged central longitudinal vertical section taken through the upper and discharge portion of the harvesting unit and the lower and intake portion of the elevator.

Fig. 3 is a vertical section taken through the upper or discharge end of the elevator.

Referring now to the drawings, the tractor is indicated in its entirety by reference numeral 10 and comprises a narrow longitudinally extending framework 11 supported at its front end by two wheels, only one of which is shown at 12, and at the rear end by two laterally spaced rear wheels, only one of which is shown at 13, mounted on a transverse axle 14. The tractor body 15, engine 16, steering system 17, seat 18 and other parts are not unlike those common to standard commercial models and are carried on the framework 11 and rear axle 14.

The cotton stripper 20, other than the material discharge elevator 21, is a conventional type and will be described for present purposes not in detail but only generally. For a complete description, reference should be made to U. S. Patent 2,533,510. The cotton stripper has a supporting frame 22 mounted on the tractor for vertical swinging about the rear axle 14. A harvester unit 23 is mounted on the frame 22 and includes at its forward section a plant receiving hood 24 which is arched to pass over the row of plants passing through the unit. Extending rearwardly from the vertical portion of the hood 24 are two side panels 25 that guide the plants into the stripping or intermediate portion of the harvesting unit 23. The stripping portion is cased in a housing 26 and has a conventional type of stripping bar and stripping roll, not shown, which operate to forcibly remove both ripe and green cotton bolls from the plants as they pass through the harvesting unit. Also provided in the intermediate portion are means for moving the picked or stripped cotton rearwardly to a cleaning unit 27 cased in a cleaning unit housing 28 which is also fixed to the frame 22. The cleaning unit 27 is also conventional, containing a plurality of rotatable cleaning devices in the form of rows of rotatable fingers which engage the cotton bolls received from the stripping unit 23 and drives them upwardly and rearwardly over a grate 30 through which dirt, gravel, and other foreign matter loosened from the cotton bolls will gravitate. The cleaning unit 27 therefore not only serves as a means for cleaning the cotton bolls but also serves as means for conveying the commingled ripe and green bolls to a transverse conveying means in the form of an auger 35 which is positioned at the rear of the cleaning unit and which receives the commingled bolls from the cleaning unit through a suitable opening in an auger housing 37 and drives them inwardly to a central discharge portion of the harvesting unit. Suitable drive means required to operate the stripping unit 23, the cleaning unit 27, and the auger unit 35 is provided and is driven from drives, such as the power take-off shaft, on the tractor. More specific details of the drive means as well as details of the cleaning unit 27 and auger unit 35 are provided in the aforementioned U. S. Patent 2,533,510. The central portion of the auger housing 37 is flanged rearwardly, as at 38, and has a material discharge opening 39 through which the cotton bolls may exit from the harvesting unit to be received into the material discharge elevator 21.

The discharge elevator 21 is pivotally mounted at its forward or intake end on a bracket 45 which is rigid with and projects rearwardly from the frame 22. Stub shafts 46 are rigid with side plates 48, 49 of the elevator 21 and are received in cooperating apertures in the bracket 45 thereby supporting the forward end of the elevator. An adjustable linkage 47 connects an upper portion of the elevator 21 to the tractor and is operative to raise or lower the elevator by adjusting the angle of inclination of the elevator.

The elevator 21 is made up of an elevator housing means comprising the vertical side plates 48 and 49 interconnected at their upper and lower edges by laterally disposed upper and lower plates 50 and 51 respectively. Included in the housing means are two other laterally disposed plates 52, 53 which also extend between the vertical side plates 48 and 49 and form in conjunction with the upper and lower plates 50, 51 upper and lower air passages or ducts 54 and 55 respectively. The lower end of the plate 53 is turned downwardly, as at 56, to form part of a blower housing. Fixed to the lower edge of the plate 51 is a laterally disposed blower housing plate 57 which has a transverse edge fixed to the plate 51 as by welding or other suitable means. The housing plate 57 is partially formed to a near semi-cylindrical shape to provide in conjunction with portion 56 of plate 53 the entire blower housing, extends forwardly from the portion forming the blower housing, and is curved upwardly, as at 58, to form the toe of the elevator. The laterally disposed plate 52 is turned downwardly at its forward end 60 and rearwardly to connect to the lower edge of the plate portion 56. Therefore (viewing Figure 2), the upper air passage or duct 54 has substantially a V-shaped cross section, one leg of which opens into the blower housing, as at 61, and the other leg of which extends substantially the length of the elevator 21 to an upper outlet 80 at the discharge end of the elevator. The lower air passage or duct 55 extends from an opening 62 in the blower housing to a lower outlet 81 at the discharge end of the elevator.

The blower means, besides the blower housing, is of a centrifugal type and is made up of fan blades 65 mounted on a transverse shaft 66 for rotation in unison therewith. The shaft 66 is supported at opposite ends by side plates 48 and 49 of the elevator housing. A belt pulley 67 is keyed to the left end of the shaft 66 and is driven by a V-belt 68 operated from a drive pulley 69 mounted on a driveshaft 70. A suitable drive including a chain and sprocket assembly 71 drives the shaft 70 and is supported on a supporting framework 73 which is fixed to the main frame 22. An air intake opening 74 is provided adjacent one end of the shaft 66.

The blower means provides first and second or upper and lower blasts of air. The upper blast of air is directed, as indicated by the arrow A1, through the opening 61 at the blower housing and through the upper air passage 54 to be discharged at the outlet 80 at the discharge end of the elevator. The lower blast of air moves, as indicated by the arrow A2, through the opening 62 and into the air passage or duct 55 to be discharged at the outlet 81.

The upper laterally disposed housing plate 50 is flanged at its lower and forward end as at 50a to overlie the flange 38 of the auger housing 37. Therefore the upper passage 54 is provided with an inlet 82, formed between the flange 50a and the edge of the plate portion 58, for receiving the mixed or commingled ripe and green bolls exiting from the discharge portion or auger 35 of the harvesting unit. A grille 83 is provided to cover the lower outlet 81 to prevent materials passing the outlet from entering the lower air passage 55.

At the upper or discharge end of the elevator is a deflector 90 having a laterally disposed panel 91 and two depending side panels 92 and 93 which are pivotally mounted at their rear end on suitable pins 94 and 95 respectively extending outwardly from the elevator side plates 48 and 49. A baffle or deflecting member 96 is mounted on a shaft 97 extending through the depending panels 92 and 93 and is disposed therebetween. A second deflector 98 is mounted on the undersurface of the lower elevator housing plate 51 by means of brackets 99 fixed to the under surface and a shaft 100 on which the deflector 98 is mounted. As indicated in Fig. 3 the deflector 98 is limited in its downward swing to a position where it abuts the lower surface of the lower elevator housing plate 51. The deflector 90 is connected to the deflector 98 by means of a pair of links 103 and 104 which have their lower ends connected to the deflector 98 and their upper ends connected to brackets 105, 106 depending from the respective side panels 92 and 93. The brackets 105, 106 are provided with elongated slots which receive the upper ends of the links 103, 104. Suitable means are provided for fixed the links 103, 104 in the slots 107, 108 at varying positions dependent upon the angle of deflection it is desired to place the deflector 91 relative to the elevator 21.

The elevator operates in the following manner. Commingled ripe and green cotton bolls are received from the discharge portion of the harvesting unit through the inlet 82 and are deposited in the upper air passage or duct 54 where the upper blast of air, being of sufficient intensity to so do, drives them upwardly and rearwardly through the passage 54 and out the outlet 80. Leaving the outlet 80 they are intercepted and redirected downwardly, in a direction indicated by the arrow A3, by the deflector 91 and the baffle blade 96 to traverse the lower blast of air moving through the outlet 81 from the lower air duct 5. The lower air blast is of sufficient intensity to cause the ripe bolls of cotton, being lighter than the green bolls, to depart from the stream of mixed bolls and to move in the direction of the air blast where the deflector 91 will again intercept them and again redirect them, as at A4, to a trailing receptacle. The green bolls, after traversing the air blast 82 will gravitate in a more or less straight downward direction A5 and will also be received in an awaiting receptacle. The grille 83 prevents green bolls passing the outlet 81 from entering the air passage 55.

While only one form of the invention has been shown it should be recognized that other forms and variations could exist without departing basically from the general principle herein disclosed. It should therefore be understood that while the preferred embodiment of the invention has been described with the view of clearly and concisely illustrating the invention, it is desired to not so limit or narrow the invention beyond that which is claimed.

What is claimed is:

1. A material conveyor and separating means for transferring and separating a commingled mixture of ripe and green cotton bolls, comprising: a housing structure forming a pair of substantially parallel and elongated air passages having a pair of respective outlets at one end, one of the passages having a material inlet at the opposite end for receiving into said one passage the commingled mixture; blower means having a blower housing connected to the housing means and opening into the passages for directing blasts of air through the passages and in the direction of the outlets, the upper blast of air being of sufficient intensity to move both the ripe and green bolls from the material inlet through the upper outlet; and means on the housing means proximate the outlets redirecting the commingled bolls exiting from the upper outlet in a stream traversing the lower blast of air, the lower blast of air being of sufficient intensity to drive the ripe bolls from the stream and in the direction of the lower blast while permitting the green bolls to continue substantially in the direction of the stream.

2. A material conveyor and separating means for transferring and separating a commingled mixture of ripe and green cotton bolls, comprising: a housing structure forming a pair of substantially parallel and elongated air passages having a pair of respective outlets at one end, one of the passages having a material inlet at the opposite end for receiving into said one passage the commingled mixture; blower means having a blower housing connected to the housing means and opening into the passages for directing blasts of air through the passages and in the direction of the outlets, the blast of air moving through the aforesaid one passage being of sufficient intensity to drive both the ripe and green bolls from the material inlet through the respective outlet of the passage; and means connected to the housing means at the latter outlet redirecting the commingled bolls exiting therefrom to move in a path traversing the other blast of air, the other blast of air being of sufficient intensity to drive the ripe bolls from the path and in the direction of said other blast while permitting the green bolls to continue in the path.

3. The invention defined in claim 2, in which the blower means is a fan mounted in the blower housing and having a pair of openings adjacent to and for permitting air to be blown into the respective pair of air passages.

4. The invention defined in claim 2, in which the aforesaid one passage through which the commingled bolls are driven is above the other air passage, and the outlet of said one passage is above the outlet of said other passage and the means for redirecting the commingled bolls are deflectors mounted on the housing means proximate to the outlets and positioned to intercept and deflect commingled bolls being blown from the outlet of said one passage and directing them downwardly into a stream passing proximate to the outlet of said other passage and through said other blast of air.

5. A material conveyor and separating means for transferring and separating a commingled mixture of ripe and green cotton bolls, comprising: a housing structure forming upper and lower elongated air passages having respective upper and lower outlets at one end, the upper passage having a material inlet at the opposite end for receiving into the passage the commingled mixture; blower means connected to the housing means and opening into the upper and lower passages for directing respective upper and lower blasts of air through the respective passages and in the direction of the respective outlets, the upper blast of air being of sufficient intensity to move both the ripe and green bolls through the upper passage; means connected to the housing means at the upper outlet redirecting the commingled bolls to move in a stream traversing the second blast of air, the second blast of air being of sufficient intensity to drive the ripe bolls from the stream while permitting the green bolls to continue substantially in the stream.

6. A material separating and elevating means for transferring and separating a commingled mixture of ripe and green cotton bolls comprising: a rigid elongated elevator housing structure inclined to the horizontal forming upper and lower elongated air passages, and having a low material intake end and an upper discharge end; blower means at the lower end of the inclined structure opening into the passages for directing upper and lower blasts of air through the upper and lower passages respectively and toward the discharge end; means forming a material inlet adjacent the lower end, said inlet opening into the upper passage for passing the commingled mixture into the path of the upper blast of air; the upper blast of air being of sufficient intensity to move both the ripe and green bolls from the material inlet through the upper outlet; and means on the housing means proximate the outlets redirecting the commingled bolls exiting from the upper outlet in a stream traversing the lower blast of air, the lower blast of air being of sufficient intensity to drive the ripe bolls from the stream and in the direction of the lower blast while permitting the green bolls to continue substantially in the direction of the stream.

References Cited in the file of this patent

UNITED STATES PATENTS

| | | |
|---|---|---|
| 2,502,817 | Bennett | Apr. 4, 1950 |
| 2,533,510 | Roscoe | Dec. 12, 1950 |
| 2,635,296 | Yeager | Apr. 21, 1953 |
| 2,645,821 | Fowler | July 21, 1953 |
| 2,699,867 | Kitten | Jan. 18, 1955 |